April 10, 1945. F. P. SAGER ET AL 2,373,503
CONTROL MECHANISM FOR MAIL TREATING MACHINES
Original Filed April 29, 1940 9 Sheets-Sheet 6
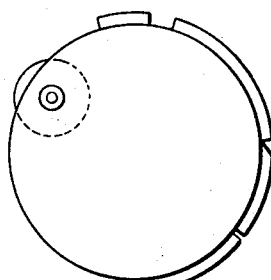
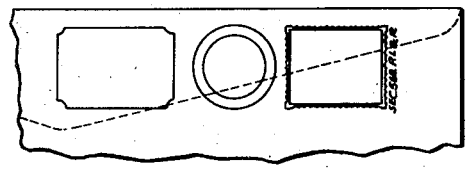
Fig. 15.
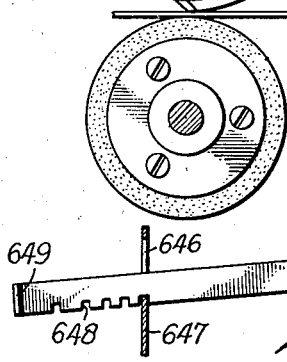
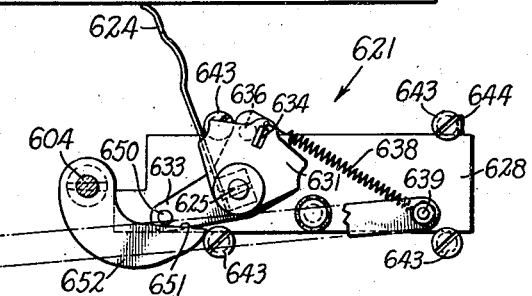
Fig. 14.
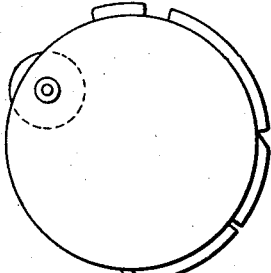
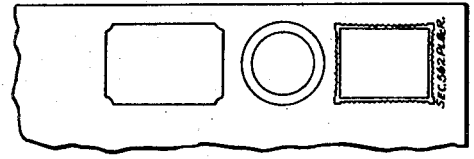
Fig. 17.
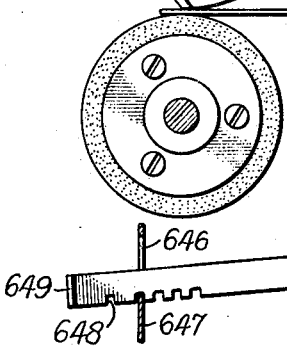
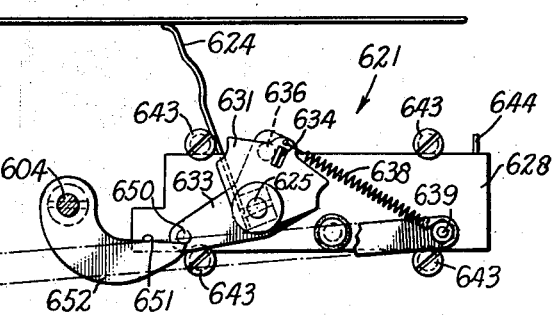
Fig. 16.
INVENTORS
Commodore D. Ryan
Frank P. Sager
BY
Blair, Curtis & Hayward
ATTORNEYS

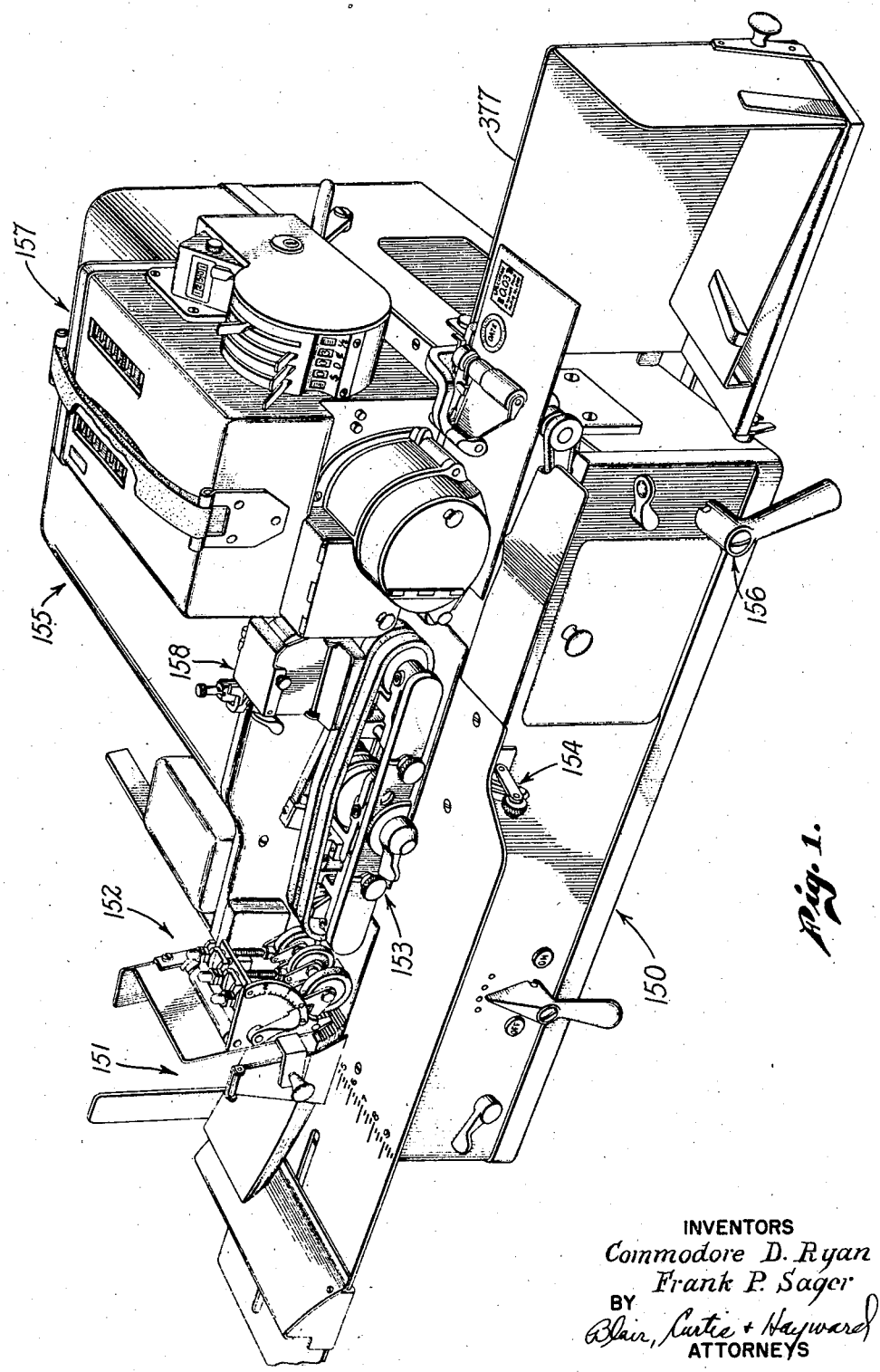

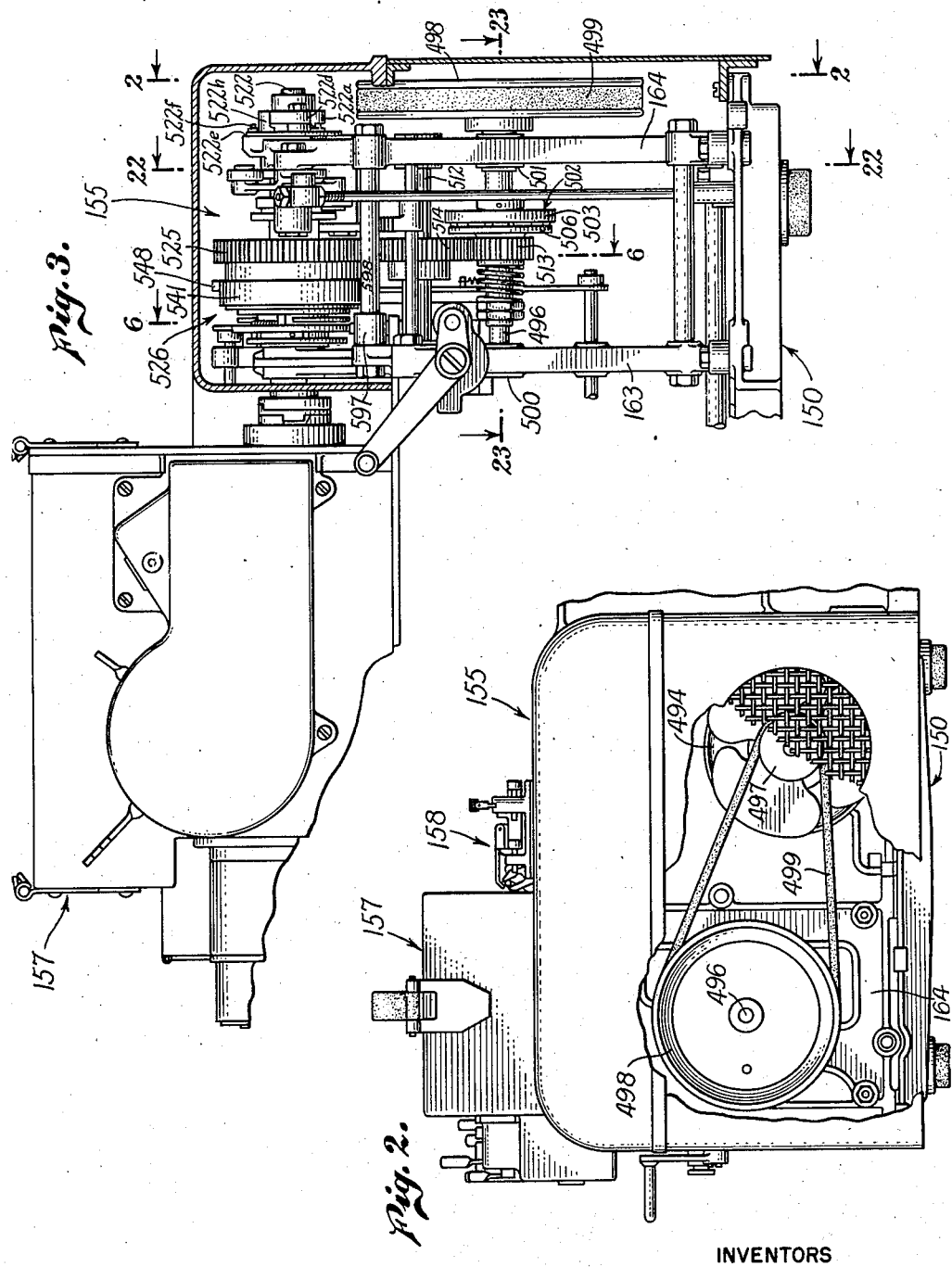

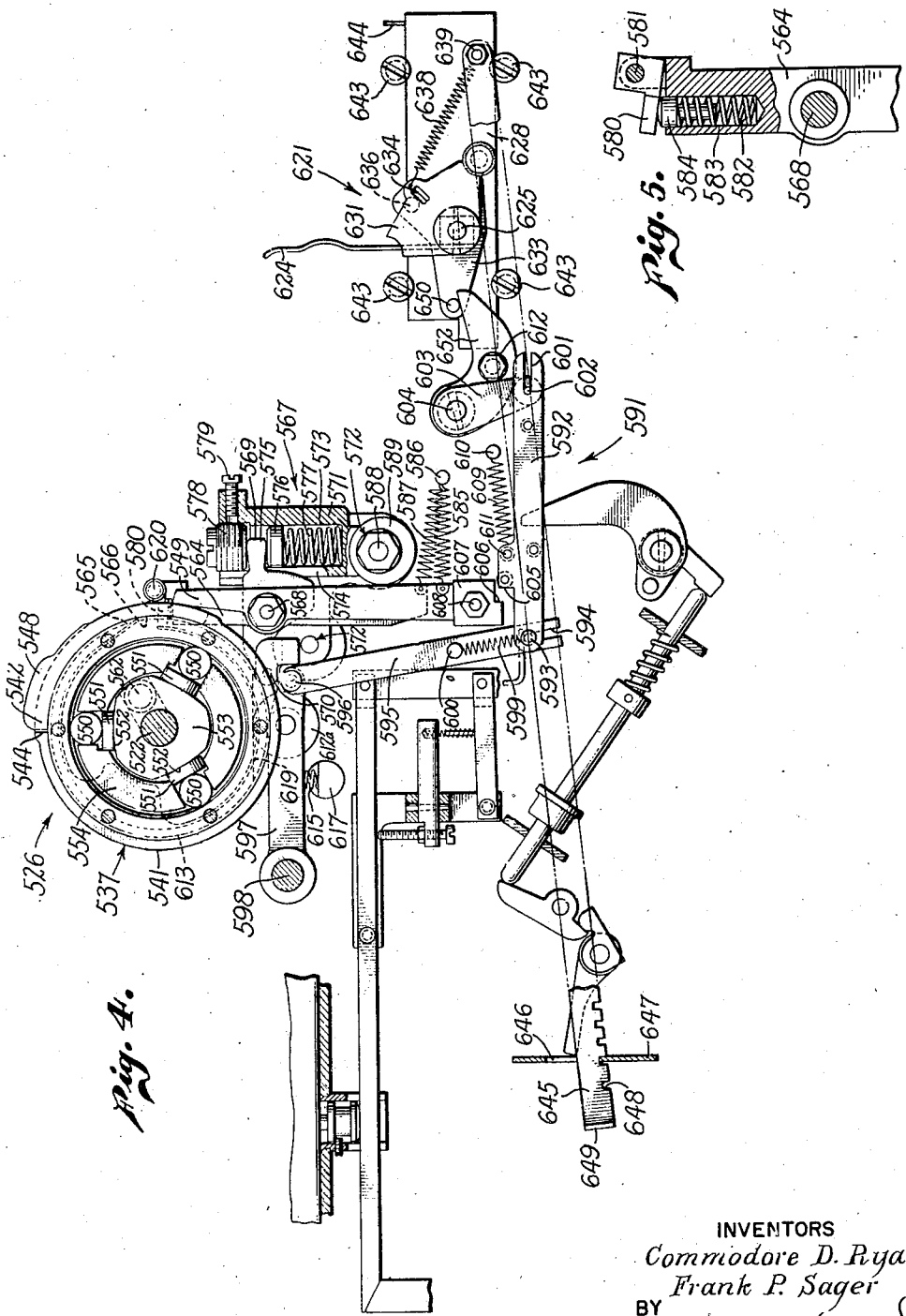

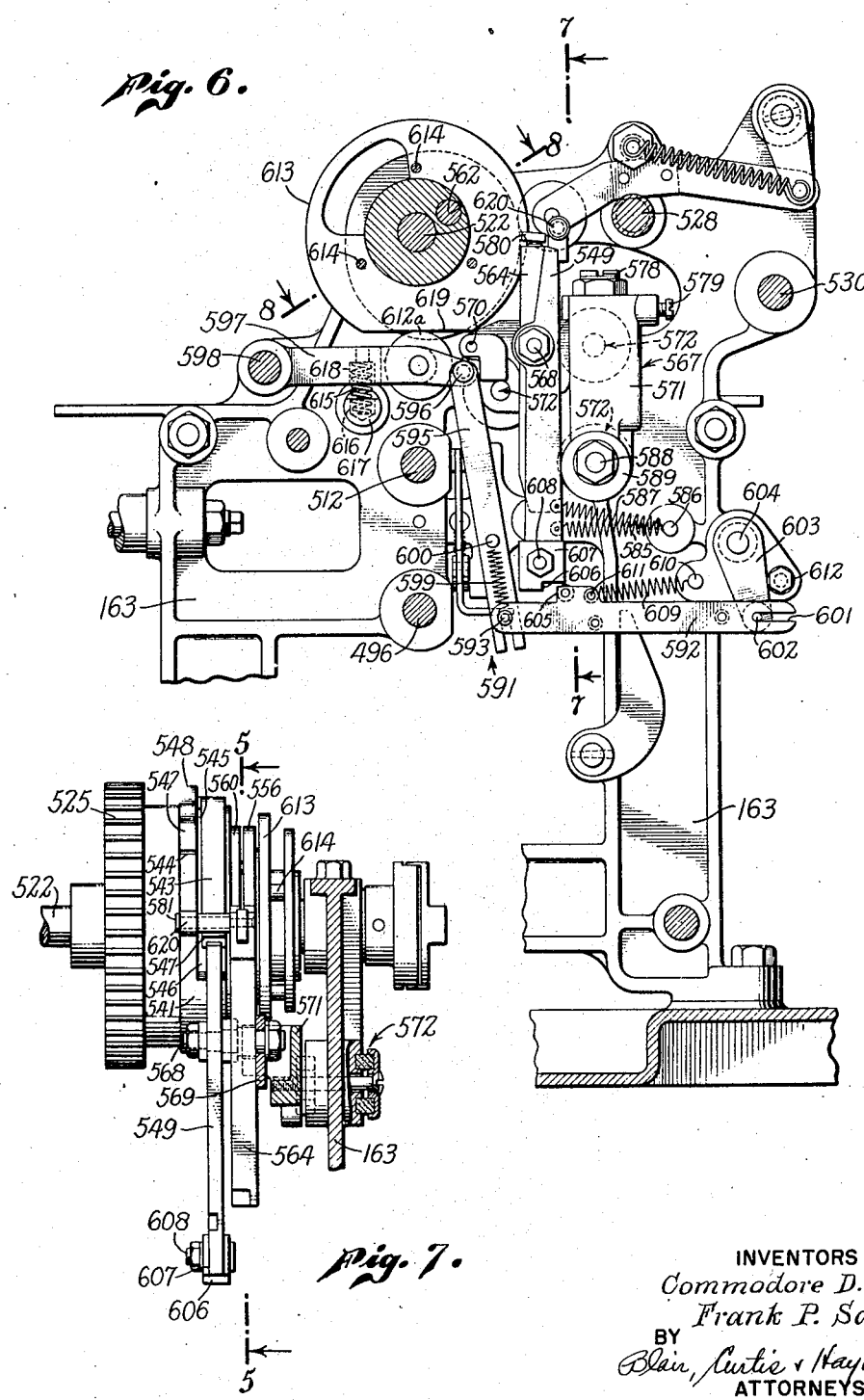

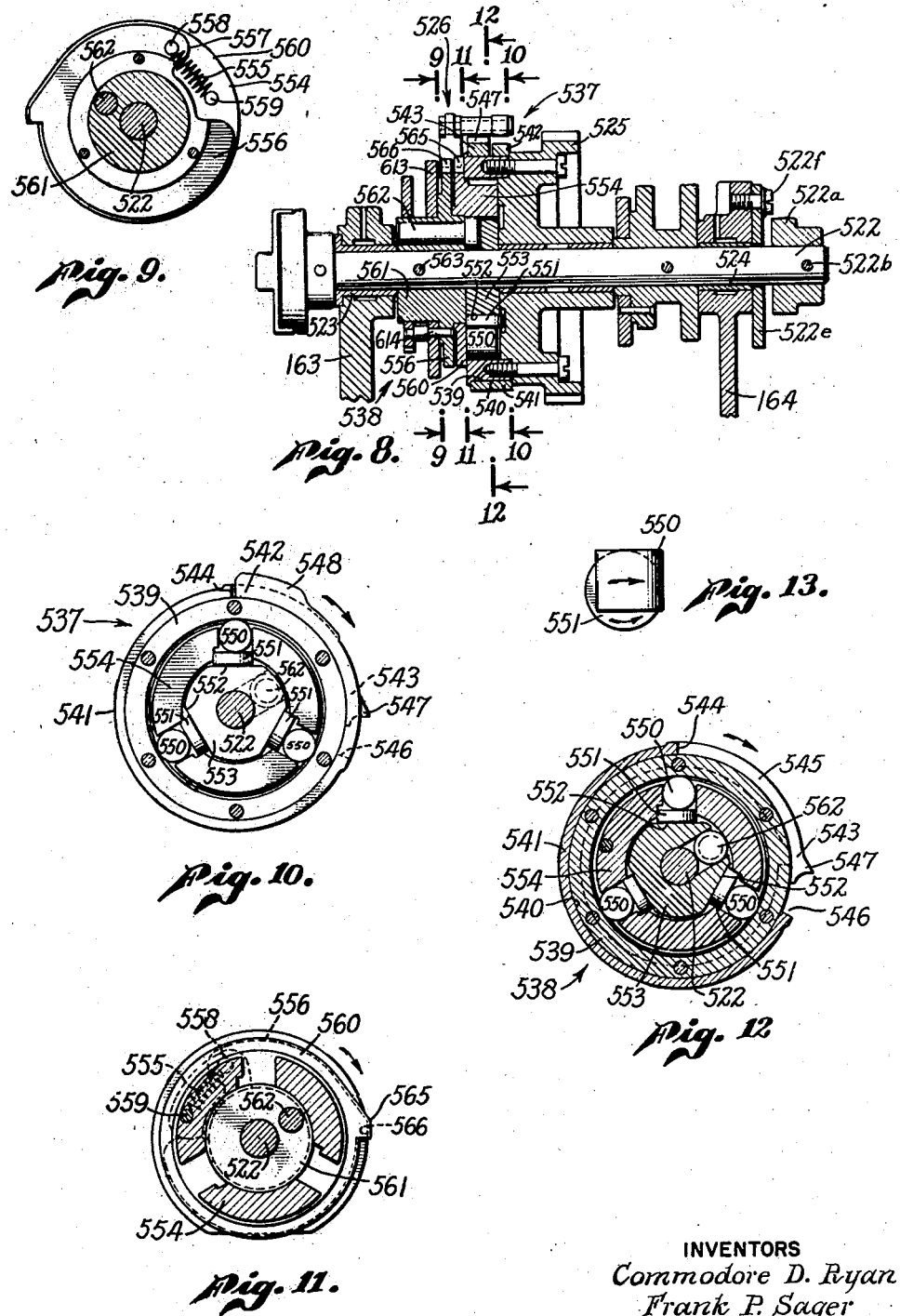

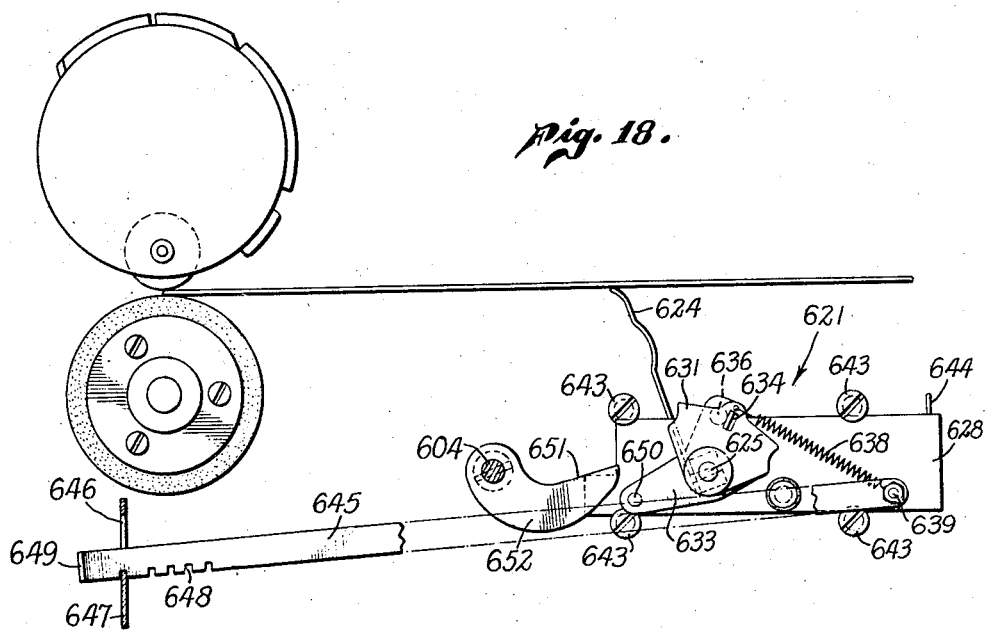
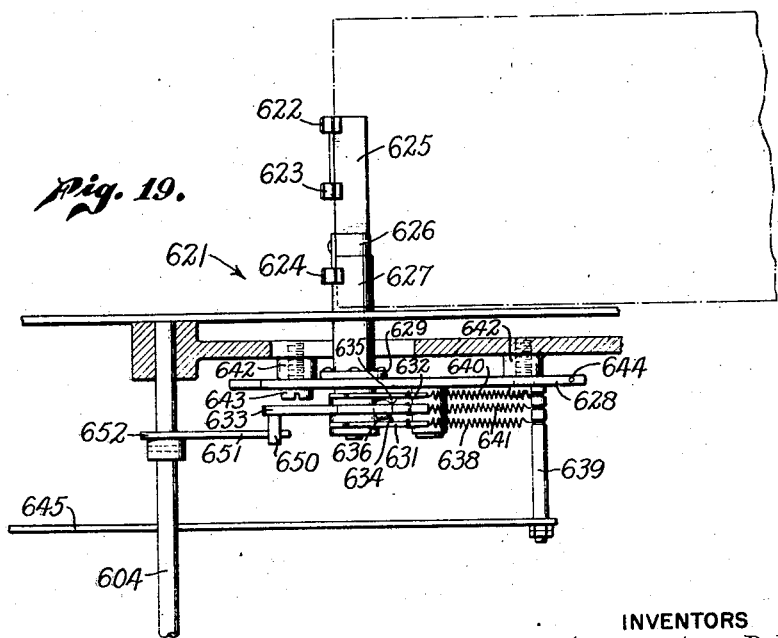

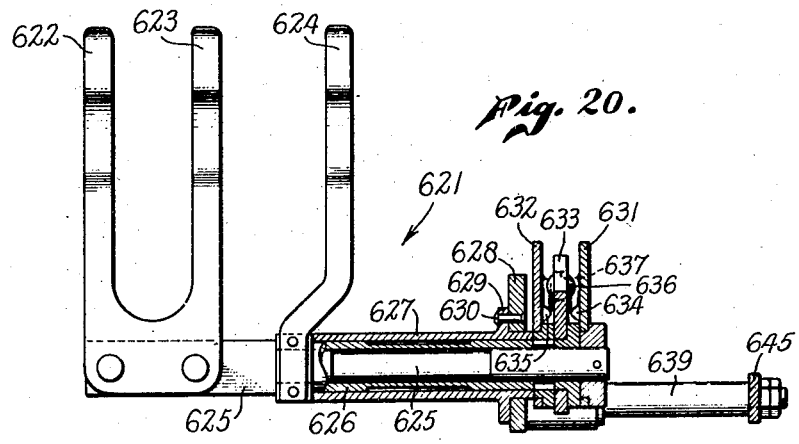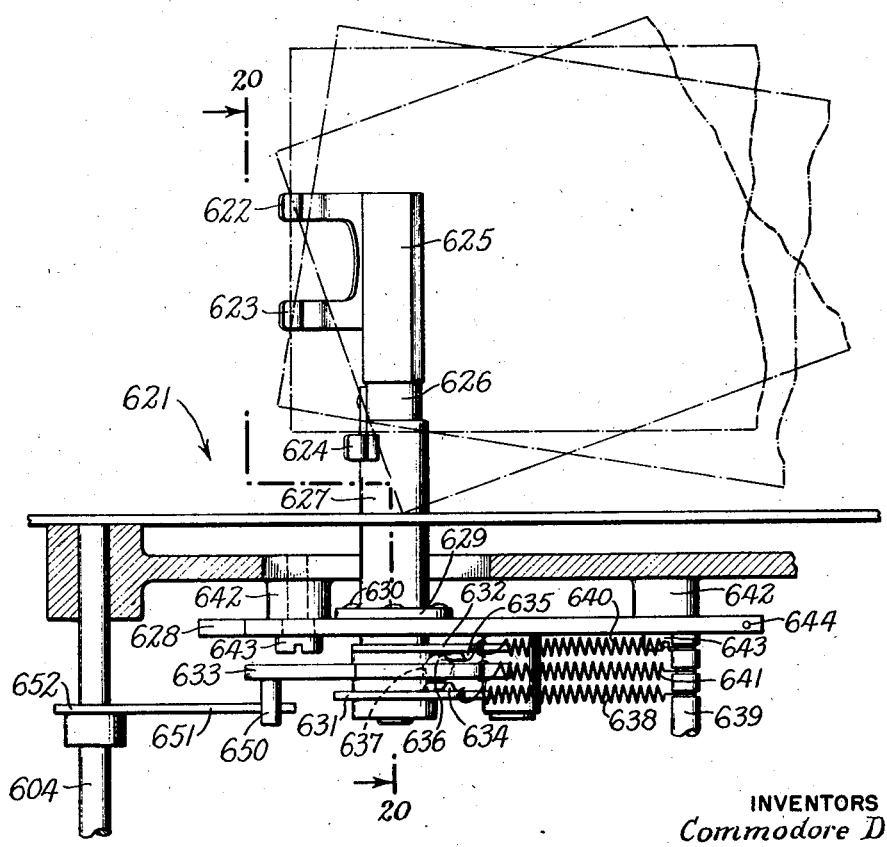

INVENTORS
Commodore D. Ryan
Frank P. Sager
BY
Blair, Curtis & Hayward
ATTORNEYS

Patented Apr. 10, 1945

2,373,503

UNITED STATES PATENT OFFICE 2,373,503

CONTROL MECHANISM FOR MAIL TREATING MACHINES

Frank P. Sager, Alhambra, and Commodore D. Ryan, Los Angeles, Calif., assignors to Commercial Controls Corporation, a corporation of Delaware Original application April 29, 1940, Serial No. 332,305. Divided and this application March 20, 1942, Serial No. 435,488

17 Claims. (Cl. 101—235)

This invention relates to improvements in a mail treating machine.

It is among the objects of this invention to provide a mail treating machine capable of operating efficiently at high speeds and effectively handling envelopes, cards and the like, varying greatly in width, length and thickness. It is a further object to provide a machine of the above nature capable of sealing and printing postage on envelopes, and also capable of sealing envelopes without printing postage thereon. Other objects will be in part apparent, and in part pointed out hereinafter.

The invention accordingly consists in the features of construction, combinations of elements and arrangements of parts as will be exemplified in the structure to be hereinafter described, and the scope of which will be indicated in the following claims.

This application is a division of the application of Frank P. Sager, et al., Serial No. 332,305, filed April 29, 1940.

In the drawings, wherein there is shown one embodiment of our invention,

Figure 1 is a perspective view of the machine;

Figure 2 is a fragmentary elevation taken along the line 2—2 of Figure 3 portions thereof being broken away;

Figure 3 is a fragmentary sectional elevation of a portion of the power plant of the machine showing the main drive and the clutch through which the printing mechanism is driven.

Figure 4 is an enlarged developed diagrammatic view of the automatic and manual clutch tripping mechanism in its neutral position, and as it would appear when the printing mechanism is mounted in place;

Figure 5 is a fragmentary view, partly in section, of the main clutch tripping and disengaging hand lever, as taken substantially in the plane of line 5—5 of Figure 7;

Figure 6 is a fragmental sectional view taken generally in the plane of line 6—6 of Figure 3, to show the delay and main clutch tripping and resetting means;

Figure 7 is a fragmental sectional view taken substantially in the plane of line 7—7 of Figure 6;

Figure 8 is a fragmental sectional view of the driving clutch and associated parts taken substantially in the plane of line 8—8 of Figure 6;

Figure 9 is a sectional view taken substantially in the plane of 9—9 of Figure 8;

Figure 10 is a sectional view taken substantially in the plane of 10—10 of Figure 8;

Figure 11 is a sectional view taken substantially in the plane of 11—11 of Figure 8;

Figure 12 is a sectional view taken substantially in the plane of line 12—12 of Figure 8;

Figure 13 is an enlarged plan view of one of the clutch rollers and its bearing disc to show the offset relation of these parts;

Figure 14 is a composite view showing the envelope tripping mechanism located in its most advanced position with respect to the printing drum of the postage printing mechanism, at which position the members stamped on the envelope will leave a relatively wide margin between the forward edge of the stamp with respect to the leading edge of the envelope, as shown in Figure 15;

Figure 15 is a fragmental view of a stamped envelope showing the members positioned as described in connection with the description of Figure 14;

Figure 16 is a view similar to Figure 14, but shows the tripping mechanism positioned to provide a narrow margin between the forward edge of the members with relation to the forward edge of the envelope as shown in Figure 17;

Figure 17 shows a fragmental portion of an envelope showing the members positioned as described in connection with the description of Figure 16;

Figure 18 is similar to Figures 14 and 16, but shows the tripping mechanism positioned to permit the sealing of envelopes without printing stamps thereon;

Figure 19 is a plan view of the envelope tripping mechanism shown in Figures 14, 16 and 18 with a portion of the supporting frame in section, and showing an envelope contacting the three trigger fingers of the device;

Figure 20 is a view taken substantially in the plane of line 20—20 of Figure 21;

Figure 21 is an enlarged view similar to Figure 19, and indicating the operation of two of the tripping fingers by envelopes conveyed through the machine out of correct printing register;

Similar reference characters refer to similar parts throughout the various views of the drawings.

General description

Figure 22:
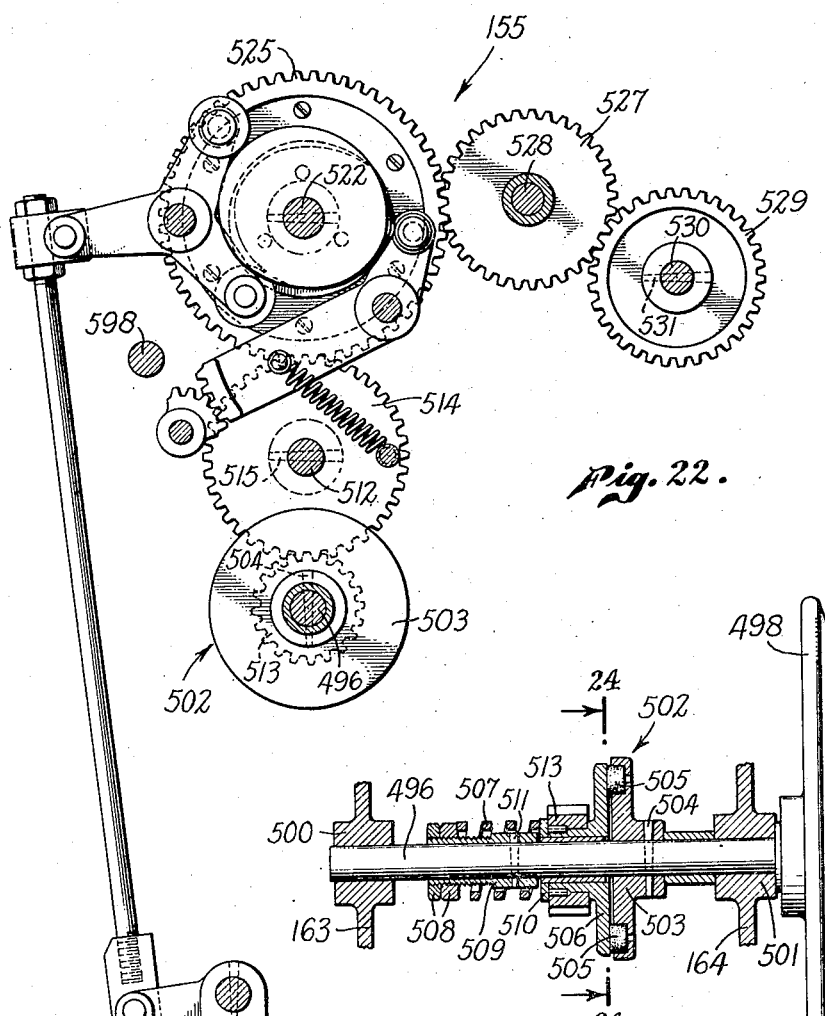
Figure 22 is a fragmental sectional view taken substantially in the plane of line 22—22 of Figure 3 to show the driving mechanism for the tape feeding device.

The preferred embodiment of the mail treating machine illustrated in the drawings is an all-purpose machine, i. e., a machine capable of ready adjustment for handling and treating all types and classes of mailing matter. This machine is capable of treating such mail matter at high speed and under full control and with protection against waste of postage or unauthorized use, and may be easily and conveniently adjusted to seal and stamp, or stamp without sealing, or seal without stamping, envelopes of various lengths, widths and thicknesses.

To attain high speed operation and versatility in handling the many different types of mailing matter, the value printing mechanism, i. e. the postage meter, should be capable of actuation in response to the movement of envelopes or cards, for example, and as automatic actuation of the postage meter is quite desirable, the mechanism which effects such automatic operation should be characterized by a high degree of sensitivity so as to respond readily to the passage of mail matter which is light in weight, and which might be torn or otherwise mutilated through lack of sensitivity.

Inasmuch as machines of this character usually operate in successive complete cycles, rather than continuously in the manner of a rotary printing press, it is necessary to provide a clutch between the power plant and the postage meter, which clutch operates in timed response to the mechanism actuated by engagement of the mailing matter. A clutch of this character should accordingly be sufficiently sturdy to withstand extended operation of the character under consideration.

Accordingly, it is toward the end of incorporating the above features, in addition to others, in a practical and efficient mail treating machine, that our invention described hereinbelow is directed.

As shown in Figure 1, the machine includes generally the following major elements and mechanisms which for convenience are identified by the general reference number preceding each:

150—frame structure
151—feed hopper
152—stripper
153—conveying feeding system for the mail matter
154—envelope flap moistening device
155—power plant and driving mechanism
156—tape feeding device
157—meter
158—ink feeding mechanism for the meter All of these elements, in addition to others, are described in detail in the above-noted Sager et al. application. The description herein is directed primarily to the mechanism for actuating the meter in response to movement of envelopes or cards through the machine to the mechanism for delaying the engagement of the clutch mechanism which connects the meter to the power plant and to the clutch itself.

Before proceeding with the detailed description of such mechanisms, it might be well to note, with reference to Figure 1, that in the operation of our mail treating machines envelopes, cards, or the like, are stacked in shingled relationship within said hopper 151, from which they are individually and successively fed through the co-action of the feeding mechanism (not shown herein) with the stripper 152 to the conveying system 153 which carries the envelop or card past the tripping mechanism (described hereinafter) to the printing mechanism of meter 157. After the envelope has been printed it is ejected into a suitable hopper or the like 377, which completes one operative cycle of the machine.

Power plant 155 (Figures 2 and 3)

Figure 23:
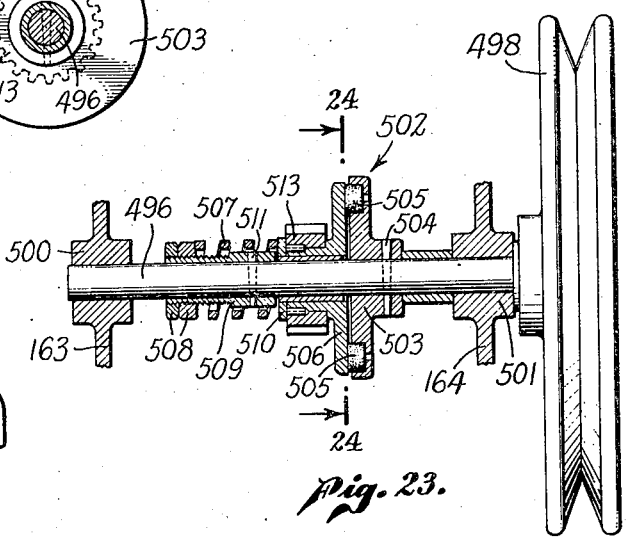
Figure 23 is an enlarged sectional view taken substantially in the plane of line 23—23 of Figure 3 to show the safety clutch; and, Figure 24 is a fragmental view taken substantially in the plane of line 24—24 of Figure 23.
Figure 24:
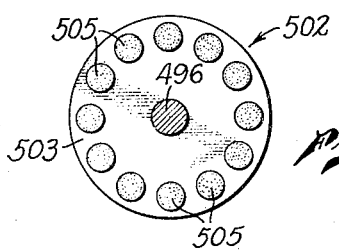

The power plant and driving mechanism therefor includes a motor 494 connected to drive a counter-shaft 496 by means of pulleys 497 and 498 connected by a belt 499. Counter-shaft 496 (Figure 3) is journaled in a bearing 500 formed in the front transmission bracket 163 of the power unit, and in a bearing 501 formed in the rear transmission bracket 164 of the power unit. Mounted on counter-shaft 496 between bearings 500 and 501 is a safety clutch generally indicated at 502, which safety clutch includes a fixed disc 503 fastened to the countershaft by a taper pin 504 (Figure 23). The fixed disc has attached thereto a series of friction pads 505 which may be formed of leather or other suitable material and project from the side face of the driving disc, as shown in Figures 23 and 24. A driving disc 506 is journaled upon countershaft 496, and is forced against driving disc 503 by a compression spring 507 so as to engage the friction pads 505 of the driving disc, as shown in Figure 23. Safety clutch spring 507 is partially compressed between a pair of lock nuts 508 mounted at one end of the threaded portion of a sleeve 509 and a thrust washer 510 carried by driven disc 506, so as constantly to bias the driven disc against fixed disc 503. Threaded sleeve 509 is secured to counter shaft 496 preferably by a taper pin 511. Through the provision of two lock nuts 508 on sleeve 509, the compression of spring 507 may be adjusted so as to thrust the driven disc 506 against friction pads 505 of driving disc 503 with sufficient force to insure the transmission of power through the safety clutch 502 for all normal operating conditions; lock nuts 508, however, should be so adjusted that in case any of the operating parts of the machine should jam or become inoperative for any reason, the safety clutch will slip thereby preventing damage to the machine.

As shown in Figure 3, power is transmitted from the driven disc 506 of safety clutch 502 to the platen driving shaft 512 through a spur pinion 513 securely mounted on the hub of safety clutch driving disc 506. This pinion meshes with a driven gear 514 secured to shaft 512 in any suitable manner. For specific details of the platen driving shaft, the manner in which it is mounted in the power unit, and the way it operates, reference is made to the above-noted Sager et al. application, as such specific details of construction and operation are not pertinent here.

The main shaft 522 of the power unit driving mechanism is journaled in a bearing 523 (Figure 8) carried by the front transmission bracket 163, and in a bearing 524 carried by the rear transmission bracket 164. A main drive gear 525 is journaled on shaft 522 between bearings 523 and 524, and meshes with gear 514 (Figure 3). The gear train comprising gears 513, 514 and 525 is shown in Figure 22, wherein it will be noted that the main driving gear 525 is slightly larger than gear 514, which latter gear is the one through which the platen roller is driven.

This difference in gear size is for the purpose of providing substantially the same peripheral speed for the platen roller and the printing drum of the meter, which roller and drum are of the same peripheral diameter as the pitch diameter of their respective gears 514 and 525.

It may now be seen, with reference to Figure 3, that shaft 496 which is driven by the motor in the power unit, drives platen roller shaft 512 and the main shaft 522 through safety clutch 502 and the train of gears 513, 514 and 525. As will be described hereinbelow, main shaft 522 drives meter 157 through a clutch which is automatically actuated upon the passage of an envelope, for example, through the machine.

Main driving gear 525 is journaled on main drive shaft 522 (Figure 8) so as to turn freely thereon, and may be connected in driving relation with shaft 522 by a meter clutch generally indicated at 526 (see also Figure 3). Meter clutch 526 is of the one revolution type, i. e. when placed in operation it operates through one full revolution and thereafter automatically releases, all as will be described hereinafter.

The meter driving clutch 526 (Figure 8) is preferably divided into two portions, namely a delay clutch portion 537 and a main meter driving portion 538. This is for the purpose of enabling the trip mechanism which is actuated during the passage of envelopes along the conveyor system to the printing station, to be positioned well in advance of said printing station, and therefore, a delay period between the actuation of the trip mechanism by the envelope and the driving of the meter must be provided to coordinate the operation of said meter with the arrival of the envelope at the printing station.

The delay portion 537 of clutch mechanism includes main driving gear 525 having a clutch ring 539 (Figure 8) provided with an annular groove 540 within which is mounted a spring ring 541. The spring ring 541 may be formed of any suitable material and is step-cut to provide overlapping end portions 542 and 543 (Figures 4, 7, 8, 10 and 12). The first portion of the step-cut is shown in Figures 7 and 8 and is indicated in these figures at 544. The second portion of the step-cut is indicated most clearly in Figures 7 and 12 at 545 and the final portion of the step-cut is shown in Figures 7 and 12 at 546. The overlapping end portion 543 of the spring ring 541 is provided with a stop lug 547 while the overlapping end portion 542 is provided with a cam lobe 548. The ring is bored slightly smaller than the diameter of groove 540 and due to its step-cut arrangement may be snapped into the groove with a slight clamping tension so as to rotate with the clutch ring.

The spring ring is normally held against rotation by providing a trip lever 549 (Figure 4) which trip lever is mounted in a manner later to be described and engages the stop lug 547 (Figure 7) of the ring. The spring ring in its endeavor to rotate against the trip lever will act to sufficiently release its clutching tension to permit the clutch ring 539 (Figure 8) to rotate relatively freely with respect to said spring ring.

Upon disengagement of trip lever 549 (Figure 7) from spring ring lug 547, the tension in the ring will act to clamp said ring in clutching engagement around the clutch ring 539 (Figure 8) and to thereby rotate the spring ring with said clutch ring. Rotation of the delay clutch spring ring 541 is employed to trip the meter clutch into driving engagement after the spring ring has turned through a predetermined portion of its revolution which in this exemplification of the invention represents the arcuate distance between the spring ring stop lug 547 and its cam lobe 548.

The meter clutch 538 is of the overrunning type and includes three equally spaced clutch rollers 550 (Figures 4, 8, 10, 12 and 13) acting between the inner periphery of clutch ring 539 (Figure 12) and bearing discs 551, which discs are freely seated upon the wedge surfaces 552 formed on the driven member 553 of said clutch. A roller retaining member 554 (Figure 10) is provided to control the position of the clutch rollers 550 with relation to the wedge surfaces 552 formed on the clutch driven member 553 and to thereby control the engagement and release of the clutch.

The clutch roller discs 551 are mounted in offset relation with respect to rollers 550 as shown most clearly in Figure 13, to cause a slight rotation of these discs each time the clutch is engaged. The rotation of discs 551 with the engagement of the clutch presents a new surface against which the rollers will wedge each time the clutch is engaged, thereby reducing the wear on the discs and preventing the rollers from seating in. As a further advantage in this arrangement, the disc 551 may be formed of high quality hardened steel and transmit the driving force to the wedge surfaces 552 of the driving member through a relatively large surface of contact, thereby greatly prolonging the life of this member.

The release and engagement of the clutch is controlled by rotating the roller retaining member 554 with respect to the clutch driven member 553. A clutch spring 555 (Figure 9) acts to urge the roller retaining member 554 in a clockwise direction as viewed in Figures 10 and 12 to advance the rollers and discs outwardly along the wedge surfaces of the driven member until the rollers enter into wedging engagement with the inner periphery of clutch ring 539. To provide the necessary room for clutch spring 555, flange 556 is cut away in the manner illustrated at 557 in Figure 9 and flange 556 is provided with a spring pin 558 extending from its side face to which one end of spring 555 is secured. The opposite end of spring 555 is connected to the spring pin 559 extending from the side face of the roller retaining member flange 560. As previously pointed out, the clutch spring acts between the driven member 553 (Figure 12) and the roller retaining member 554 to continuously urge the rollers into driving engagement with the clutch ring 539. The resistance of the mechanism driven by the clutch governs the wedging action of the rollers during the driving operation. The driven member 553 is connected to hub 561 of flange 556 by means of a headed driving pin 562 as shown in Figures 8–12 inclusive, and the hub is in turn keyed to the main drive shaft 522 by means of taper pin 563 (Figure 8).

The driving clutch is normally maintained disengaged by means of clutch control lever 564 (Figures 4–8, inclusive). This lever engages a stop lug 565 formed on the periphery of the roller retaining member flange 560 as shown in Figures 4, 6, 7 and 8. By this engagement the roller retaining member 554 is stopped in its rotation, releasing the clutch rollers from their wedging engagement with the clutch driving ring 539. A stop lug 566 is formed on the periphery of flange 556 and engages the clutch control lever 564 to stop the rotation of the clutch and mechanism driven thereby at the end of each operating cycle of the machine.

Means are provided to prevent reverse rotation of flange 556 when the clutch is disengaged at the end of each operating cycle of the machine and this means (Figures 2 and 8) may include a stop disc 522a secured upon the rear end of shaft 522 by means of taper pin 522b. The stop disc is provided with a stop shoulder 522c (Figure 2) which shoulder is engaged by the free end of stop pawl 522d pivotally carried by a suitable supporting disc 522e mounted upon the rear frame bracket 164 by means of screws 522f. A compression spring 522g acts between the free end of stop pawl 522d and spring pin 522h which pin is carried by the supporting disc 522e. This spring acts to yieldingly maintain the stop pawl in operative engagement with the stop disc 522a. The stop shoulder 522c is positioned to be engaged by said pawl just prior to the disengagement of clutch 526.

The clutch will remain in its disengaged condition as long as the stop lugs 565 and 566 (Figure 4) are held against rotation by the clutch control lever 564. The disengagement of control lever 564 from the stop lugs 565 and 566 will permit the clutch spring 555 (Figure 9) to advance the roller retaining member 554 and to thereby return the clutch rollers into wedging engagement with the clutch driving ring 539, in the manner previously described to drive the machine through a complete cycle of operation. Upon the completion of this cycle of operation the stop lugs 565 and 566 (Figure 4) will again contact the clutch control lever 564 to disengage the clutch and stop the driven mechanism of the machine.

The trip lever 549 and clutch control lever 564 are mounted on a shock absorbing or cushioning means generally indicated at 567 in Figures 4, 6 and 7. The trip lever 549 and the clutch control lever 564 are pivotally mounted on a common pivot pin 568 (Figure 4) carried by supporting lever 569. The supporting lever 569 is hinged as at 570 to a bracket casting 571 which casting in turn is mounted on the front transmission bracket 163 at three different points by suitable shock absorbing devices 572 (Figure 6). The bracket casting 571 (Figure 4) is provided with a vertical bore 573 and the wall of the bore adjacent the clutch trip and control levers is slotted as at 574. The supporting lever 569 is provided with a finger 575 which projects through slot 574 into bore 573 and rests on top of disc 576, which disc is maintained in its uppermost position by compression spring 577 acting between said disc and the bottom of the bracket casting bore 573.

To limit the upward movement of support lever finger 575, the upper end of the bracket casting bore 573 is screw threaded to receive an adjusting plug 578 which plug is maintained in its adjusted position by a suitable set screw 579.

This mechanism absorbs the major shock in stopping the driving clutch at the end of its operating cycle. In order to prevent the upsetting or battering of the upper end of control lever 564, as well as the stop lugs 565 and 566, the upper end of stop lever 564 is provided with additional cushioning means in the form of a plate 580 (Figure 5) hinged to the upper end of control lever 564 as at 581 and yieldingly engaged by a compression spring 582 which compression spring 582 is interposed between the bottom of spring bore 583 and a headed pin 584. The head of this pin engages the under surface of the hinge plate 580. The clutch trip lever 549 (Figure 4) is yieldingly maintained in the path of delay clutch stop lug 547 by spring 585 interconnected between the lower end of trip lever 549 and a pin 586 on the transmission frame bracket 163. The clutch control lever 564 is yieldingly maintained in the path of stop lugs 565 and 566 of the main clutch by means of a spring 587 interconnected between the lower end of lever 564 and pin 586.

A pair of eccentric stop discs 589 and 590 are mounted on screw 588 to control the rest position of the clutch trip and control levers 549 and 564 respectively.

*Clutch control mechanism 591 (Figure 4)*

A clutch control mechanism 591 is arranged to be operated by envelopes passing along the conveyor system 153 (Figure 1) to actuate the delay clutch trip lever 549 (Figure 4) and through the operation of the delay clutch to engage the meter driving clutch 526, and is automatically conditioned for manual operation when the tape feeding device is moved into its printing position.

The clutch mechanism also includes safety control features whereby unless the machine is in proper operating condition, the clutch control mechanism cannot be actuated to drive the meter. The entire clutch control mechanism is shown diagrammatically in Figure 4, and in detail with relation to other parts of the machine in Figures 6, 7, 14, 16, 18–21, inclusive.

Certain portions of the clutch control mechanism are common to both the automatic and manual actuating elements. The portion of the control mechanism common for both manual and automatic actuating elements comprises a horizontally floating link 592 which is provided at its left end as viewed in Figure 4 with a pin 593. The pin 593 is slidably associated with slot 594 in the lower end of an upwardly extending radius link 595, the upper end of which link is hinged as at 596 to the end of cam lever 597. The cam lever is pivotally mounted on tie bar 598 used for keeping the front and rear transmission brackets 163 and 164 in a spaced apart relation (see Figure 3).

A tension spring 599 (Figure 4) is interconnected between the pin 593 on floating link 592 and pin 600 on the radius link 595 to resiliently urge the pin 593 against the upper end of slot 594. The opposite end of floating link 592 is provided with a longitudinal slot 601 which engages a pin 602 on a lever 603 which lever in turn is rigidly fastened to a shaft 604 in any suitable manner. The shaft 604 is pivotally supported in the front transmission bracket 163 and extends towards the front of the machine where it is adapted for connection to a tripping device actuated by the mail matter passing along the conveyor system 153 as will be later described. The upper edge of floating link 592 is provided with an abutment 605 which is adapted to engage the surface 606 of step-cut block 607 fastened to the lower end of delay clutch trip lever 549 by means of a screw and nut assembly 608.

A tension spring 609 is interposed between pin 610 on the front transmission bracket 163 and pin 611 on the floating link 592 normally urges said floating link to the right as viewed in Figure 4 so that the end of slot 601 engages the pin 602 on lever 603 thereby maintaining said lever against stop 612 (Figures 4 and 5) which is mounted on the front transmission bracket 163.

The lever 597 is provided with a cam roller 612a which is arranged to engage cam 613 rigidly mounted on the flange 556 by means of pins 614 as may be seen in Figures 4, 6, 7 and 8. As has been pointed out before, the flange 556 is provided with a hub 561 which hub is securely mounted on shaft 522 by pin 563 whereby the cam 613 is rigidly fastened to said shaft.

To provide a yielding engagement between cam roller 612a and cam 613, the cam lever 597 is urged upwardly by means of compression spring 615 which is interposed between the bottom of bore 616 (Figure 6) drilled in stud 617 fastened to the front transmission bracket 163 and the bottom of a counterbore 618 in the cam arm 597. The periphery of the cam 613 is provided with a flat portion 619 which is in engagement with cam roller 612 when the main shaft 522 and its associated clutch 526 are in their normal rest position, as illustrated in Figures 4 and 6.

As has been pointed out in the above-noted Sager et al. application, the clutch control mechanism 591 may be operated automatically either by the mail matter passing along the conveying system 153 or manually when a gummed tape device described in said application is in printing position. The automatic and manual controls are both operative (but not concurrently) to drive the floating link 592 to the left as viewed in Figures 4 and 6 to effect engagement of the clutch.

When the clutch control mechanism 591, main shaft 522 and its associated clutch 526 are all in their rest position as shown in Figure 4, the floating link abutment 605, during the longitudinal travel of the floating link 592 to the left will engage the surface 606 at the lower end of delay clutch trip lever 549 and will thereby swing said trip lever 549 in a clockwise direction, as viewed in Figures 5 and 6, about pin 568, causing the upper end of said lever to disengage the stop lug 547 of the delay clutch spring ring 541. The spring ring 541, upon its release, will contract about the periphery of the clutch ring 539 causing said spring ring to rotate therewith. After a predetermined rotation of the delay clutch spring ring 541, its cam lobe 548 will engage roller 620 mounted on pin 581 at the upper end of the clutch control lever 654 swinging said control lever in a clockwise direction, as viewed in Figures 4 and 6, to release the stop lugs 565 and 566 on the flanges 560 and 556 respectively, thereby operatively engaging the meter driving clutch 526.

The initial rotation of cam 613 depresses cam lever 597 downwardly which in turn through radius link 595 depresses the floating link 592. This downward movement of link 592 lowers its abutment 605 until said abutment clears the surface 606 formed on the lower end of delay clutch trip lever 549 to thereby permit said trip lever to return to its normal position even though the envelope or manual trip mechanisms should be maintained depressed during the operation of the meter driving clutch and thereby insuring the automatic disengagement of the main driving clutch at the end of each operating cycle of the machine in the manner previously described.

If the driving shaft 522 and its associated clutch 526 should be in any other than their normal rest position illustrated in Figures 4 and 6, cam lever 597 will be depressed by cam 613 so that the floating link abutment 605 will pass below the trip lever contact surface 606 upon actuation of link 592 by either of the previously referred to tripping elements, thereby preventing the actuation of the delayed clutch control lever 549.

The floating link 592 is actuated to swing the delay clutch tripping lever 549 to release the delay clutch into driving engagement each time an envelope or other piece of mail matter is conveyed past the envelope tripping mechanism 621 (Figures 14-21). Any suitable form of envelope trip mechanism may be employed.

It is one of the features of this invention, however, to provide a trip mechanism which may be operated by only those envelopes which are conveyed by the conveyor system 153 in proper printing register and to pass those envelopes which are conveyed by the conveyor system out of proper printing register without placing the meter clutch in operation.

The envelope trip mechanism preferably includes three space trigger fingers 622, 623 and 624 (Figure 20). Triggers 622 and 623 may be formed as part of a single plate securely fastened to one end of control shaft 625, while the third trip finger 624 may be fastened upon one end of control sleeve 626. Control shaft 625 is journaled in control sleeve 626 and the control sleeve in turn is journaled in a suitable bearing 627 fastened to the control carriage 628 by flange 629 and rivets 630 (Figures 20 and 21). It is desirable to associate with said triggers a control mechanism arranged to respond to the simultaneous action of said triggers for actuating the clutch tripping mechanism and which control mechanism will be inoperative to actuate the clutch tripping mechanism when one of said triggers is not actuated by the envelope or mail matter conveyed by the conveying system. This control mechanism may include a control element 631 fastened to the opposite end of control shaft 625 and a second control element 632 fastened upon the inner end of control sleeve 626 and interposed between these two control elements is a trip lever 633 journaled upon the control shaft 625. The control element 631 is provided with a cam lug 634 while the control element 632 is provided with a similar cam lug 635 positioned in opposed relation, and said lugs being directly opposite when the triggers are in their normal retracted positions.

The trip lever 633 is provided with a ball 636 mounted within a suitable bore 637, said ball being of a greater diameter than the thickness of said lever as shown in Figures 20 and 21. The ball 636 is confined within bore 637 by the control elements 631 and 632 which are spaced sufficiently apart to permit limited movement of the ball within its bore 637. The ball 636 acts as a key which is engaged by cam lugs 634 and 635 when the trip fingers are simultaneously moved when engaged by an envelope to transmit the movement of the triggers to the trip lever 633.

If, however, the triggers 622 and 623 which are fastened to control shaft 625 are moved while the trigger 624 remains in its normal position of rest as shown in Figure 21, the control element 631 will be advanced, while the control element 632 remains in its rest position, the movement of control element 631 advances its cam lug 634 into engagement with the trip lever ball 636 and pushes the ball out of its path of travel in the manner shown in this figure, and as a result, the trip lever 633 will remain in its normal retracted position and therefore, will not actuate the clutch tripping mechanism.

This action is reversed when the envelope trigger 624 is actuted while the triggers 622 and 623 remain stationary, in which case the cam lug 635 of control member 632 will displace the ball in the same manner as it was displaced by the cam lug 631, and as a result the meter will not be placed in operation.

In order to actuate trip lever 633, all of the envelope triggers must be operated simultaneously thereby rotating the two control elements 631 and 632 in unison, whereupon the two lugs 634 and 635 will correspondingly be advanced in unison locking the trip lever ball between them and thereby actuating the trip lever 633 which actuation, through the mechanism to be described, will place the meter driving clutch in operation.

A tension spring 638 acts between control elements 631 and spring shaft 639 to yieldingly maintain the envelope triggers 622 and 623 in its envelope engaging position. A similar spring 640 acts between the control element 632 and spring shaft 639 to maintain the envelope trigger 624 in its envelope engaging position and a spring 641 is provided to act between the trip lever 633 and spring shaft 639 for yieldingly maintaining this lever in its retracted position.

As described in detail in the above-noted Sager et al. application, a guide plate 170 (Figures 19 and 21) extends from hopper 151 to the meter printing drum to guide the envelopes during their passage through the machine and properly align them not only with the printing drum, but also with triggers 622, 623 and 624, so that the leading edge of the envelope will engage the three triggers simultaneously to effect actuation of trip lever 633, as hereinbefore described.

The control carriage 628 which carries the envelope trigger mechanism is mounted upon the rear face of the intermediate frame plate 161 by providing this plate with four spaced lugs 642 and shoulder screws 643 as shown in Figures 14–21 of the drawings.

The carriage is provided with an upstanding stop pin 644 which engages one of the shoulder screws 643 when the carriage has been moved to its position of adjustment as shown in Figure 14. Control carriage 628 is made adjustable in order to enable the envelope trigger mechanism to be selectively positioned along the conveyor system to determine the space between the leading edge of the envelopes and the stamps printed thereon.

The means for adjusting and maintaining the control carriage in its position of adjustment may include pivotally connecting a latch bar 645 (Figure 18) upon the spring shaft 639 and extending the latch bar through a suitable opening 646 formed in end plate 647 and providing the latch bar with a series of adjusting notches 648. These notches are arranged to engage the lower edge of the slot 646 to maintain the latch bar in its adjusted position. The forward end of the latch bar is provided with a right angle bend as shown at 649 to provide an operating handle.

The envelope trigger carriage 628 may be adjusted by lifting latch bar 645 by means of its handle until the notch is released from the side plate and then shifting the carriage until one of the other notches representing the desired location of adjustment of the carriage has been reached whereupon the carriage may now be locked in its new position by engaging the notch with the end wall 647 in the manner previously described.

In Figure 14, the trigger carriage 628 is shown latched in the last of the adjustment notches 648 and in this position, the stop pin 644 engages one of the shoulder screws 643 in which position the stamp will be placed on the envelope at its greatest spacing from the leading edge thereof, as shown in Figure 15.

In Figure 16 the carriage is shown as it would appear when the latch bar has been shifted until the fourth notch is in engagement with the lower edge of the side plate slot 646. In this position, the stamp will be placed upon the envelope as shown in Figure 17.

With the adjustment of latch bar 645 as shown in Figure 18, the envelope trigger carriage will be advanced to disconnect it from the clutch control actuating mechanism in a manner to be described. When the envelope trigger carriage is adjusted in this position, envelopes passing through the conveyor system cannot, through the actuation of the triggers, place the meter driving clutch in operation and, therefore, this adjustment of the trigger carriage is employed when envelopes are to be sealed without printing postage thereon and may be referred to as the sealing adjustment.

The trip lever 633 is provided with a trip pin 650 extending from the side face thereof and arranged to engage the cam surface 651 of bent lever 652 fastened to the forward end of shaft 604 of the clutch tripping mechanism 591.

As may be noted when comparing Figures 14, 16 and 17, the trip pin 650 will engage the cam surface 651 of bent lever 652 while the latch bar 645 is positioned to engage any one of the first four of its notches 648 with the end wall 647. When the latch bar is positioned to engage the last of its notches with the end wall, the tripping pin 650 will be advanced beyond the bent lever cam surface 651 as shown in Figure 18, thereby disconnecting the envelope trigger mechanism from said surface and through this disconnection the triggers cannot be employed for actuating the clutch tripping mechanism to place the meter driving clutch in operation.

From the above it may be seen that we have provided a delay action clutch and control mechanism therefor well adapted to the mail treating machine, and which attain the several objects set forth hereinbefore in a thoroughly practical and efficient manner.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In an object treating machine, an object treating element, means for presenting objects in serial order thereto, trigger means arranged to be actuated by each object presented to said element, a control mechanism associated with said trigger means and arranged to respond to the action of said trigger means when engaged by one of said objects for rendering the treating element active to treat said object, and means movable toward and away from said treating element for predetermining the location of the trigger means with relation to said treating element in order to predetermine the treating register of said objects.

2. In a control mechanism for rendering the treating element of an object treating machine active to treat objects serially presented thereto by a conveyor, including a plurality of trigger means intercepting the path of travel of objects carried by the conveyor and each of said trigger means having a cam surface associated therewith, a control member for rendering the treating element active, and a key means carried by the control member and arranged to be engaged by the cam surfaces of said trigger means to actuate the control member when all of said trigger means are moved in unison, and to pass the cam surfaces without actuating the control member when said trigger means are not moved in unison.

3. In an object treating machine, an object treating element, means for presenting objects in serial order thereto, a trigger arranged to be actuated by each object presented to said element, a control mechanism associated with said trigger and arranged to respond to the action thereof when engaged by one of said objects for rendering said treating element active to treat said object, and means movable toward and away from said treating element for predetermining the location of said trigger with relation to said treating element in order to predetermine the treating register of said objects.

4. In an object treating machine, means for presenting objects in serial order thereto, a member slidably mounted on said machine, a trigger pivotally mounted on said member and disposed in the path of said objects to be actuated thereby when each is presented to said element, a control mechanism associated with said trigger and arranged to respond to movement of said trigger when it is engaged by one of said objects for rendering said treating element active to treat said object, and means for selectively positioning said member and accordingly said trigger with relation to said treating element in order to predetermine the treating register of said objects.

5. In an object treating machine, means for presenting objects in serial order thereto, a member slidably mounted on said machine, a trigger pivotally mounted on said member and disposed in the path of said objects to be actuated thereby when each is presented to said element, a control mechanism associated with said trigger and arranged to respond to movement of said trigger when it is engaged by one of said objects for rendering said treating element active to treat said object, and means for moving said member and accordingly said trigger out of operative association with said control mechanism whereby said objects can pass through said machine without actuating said object treating element.

6. In an object treating machine, a source of power, an object treating element, clutch means operable for connecting said element with said source, a trigger arranged to be actuated by each object presented to said treating element, a link, means mounting said link for substantially horizontal and pivotal movement, means forming an operative connection between said trigger and said link whereby when said trigger is moved upon engagement by one of said objects therewith said link is moved horizontally, a clutch control member for normally holding said clutch in disengaged condition, said member adapted to be engaged by said link upon horizontal movement thereof to engage said clutch, means operated by said source of power during operation of said treating element for pivoting said link out of a position where horizontal movement thereof would actuate said member, means for returning said member to its normal clutch disengaging position subsequent to its engaging actuation, and means forming a shock mount for said member to absorb shock entailed upon clutch disengaging operation of said member.

7. In a mail treating machine, in combination, a printing drum operable to print on mail matter, means for delivering mail matter in serial order to said drum, trigger means arranged to be actuated by each piece of mail delivered to said drum, a carriage movably mounted on said machine, said trigger means being secured to said carriage, a control mechanism associated with said trigger means and arranged to respond to the action of said trigger means when engaged by a piece of mail for rendering said printing drum active to print on said mail, and means for manually moving said carriage and accordingly said trigger means relative to said printing drum for predetermining the location of the trigger means with relation to said printing drum thus to predetermine the printing register of the mail matter.

8. Apparatus according to claim 7 in which the means which moves the carriage comprises a member having one end secured to the carriage and its other end extending exteriorly of the machine so as to be readily accessible for manual operation.

9. Apparatus according to claim 7 in which the means which moves the carriage comprises a member having one end secured to the carriage and its other end extending exteriorly of the machine so as to be readily accessible for manual operation, and means for locating said element in any one of a plurality of adjusted positions.

10. Apparatus according to claim 7 wherein said carriage is movable to an extreme position wherein said trigger means are disabled to actuate said control mechanism whereby actuation of the trigger means when in said extreme position does not effect operation of the printing drum.

11. Apparatus according to claim 2, wherein the cam surfaces on the trigger means are opposed to one another and when operated in unison engage the key means to actuate the control member, said key means comprising a movable element displaceable in one direction or the other by either of said trigger means when said trigger means are not moved in unison.

12. In a delay type of clutch control mechanism wherein there is a predetermined delay following each actuation of the clutch control mechanism before the source of power can be transmitted through the main driving clutch, in combination, a driving member, a driven member, normally disengaged means associated with said members and engageable therewith to effect a driving relation therebetween, a spring element frictionally associated with said driving member and having a bias tending to connect it thereto so as to be driven thereby, movable trip means normally holding said element out of driving relation with said driving member and movable out of its holding position to release said element into tight engagement with said driving member so as to be driven thereby, and second trip means normally holding said first-mentioned means out of engagement and adapted to be moved to a releasing position by said spring element at a time subsequent to its operation by said driving member.

13. Apparatus according to claim 12 wherein said driving member comprises a drum which is constantly driven from the source of power and said spring element comprises a slip ring disposed about said drum and normally held out of driving relation with said drum by said first trip means, said slip ring having a contracting bias which causes it to grip said drum when it is released upon movement of said first trip means.

14. Apparatus according to claim 12 wherein said second trip means comprises a pivoted lever and means on said spring element for pivoting said lever out of its holding position in relation to said normally disengaged means thereby to effect a driving relation between said driving and driven members.

15. Apparatus according to claim 12 wherein said second trip means comprises a pivoted lever and means on said spring element for pivoting said lever out of its holding position in relation to said normally disengaged means thereby to effect a driving relation between said driving and driven members, and spring means for moving said lever back into a position to hold said normally disengaged means to disconnect said members subsequent to one cycle of operation thereof.

16. In an object treating machine having a treating mechanism for treating objects successively delivered thereto, a driving means and a clutch for coupling said driving means to said mechanism, means for engaging and disengaging said clutch comprising: control means associated with said clutch and movable between clutch engaging and disengaging positions, means including a lever actuated by movement of each object toward said treating device, a link pivotally connected to said lever and adapted upon movement thereof to move longitudinally with respect to said control means for moving said control means to its clutch engaging position, and interlock means responsive to an operative condition of said treating mechanism and movable against one edge of said link to hold it clear of said control means when said treating mechanism is in said condition to prevent actuation thereof in response to the longitudinal movement of said link.

17. In a printing machine, printing means located at a printing station, means for consecutively feeding matter to be printed thereto, and control means rendered active by each piece of matter arriving at the printing station for rendering the printing means active to print an impression thereon, in which the matter engaging portion of said control means is adjustable along the path of travel of the matter for predetermining the longitudinal position of the printing of the impression thereon.

FRANK P. SAGER.
COMMODORE D. RYAN.